United States Patent
Siraj et al.

(10) Patent No.: US 9,622,269 B2
(45) Date of Patent: Apr. 11, 2017

(54) OPTIMIZING THE USE OF SHARED RADIO FREQUENCY MEDIUM USING INTELLIGENT SUPPRESSION OF PROBE REQUEST FRAMES

(71) Applicant: Aruba Networks, Inc., Sunnyvale, CA (US)

(72) Inventors: Mohd Siraj, San Jose, CA (US); Partha Narasimhan, Saratoga, CA (US); Sachin Ganu, San Jose, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 267 days.

(21) Appl. No.: 14/634,469

(22) Filed: Feb. 27, 2015

(65) Prior Publication Data

US 2016/0255661 A1  Sep. 1, 2016

(51) Int. Cl.
| | | |
|---|---|---|
| *H04W 4/00* | (2009.01) | |
| *H04W 76/02* | (2009.01) | |
| *H04W 48/20* | (2009.01) | |
| *H04W 84/12* | (2009.01) | |
| *H04W 48/16* | (2009.01) | |

(52) U.S. Cl.
CPC .......... *H04W 76/02* (2013.01); *H04W 48/20* (2013.01); *H04W 48/16* (2013.01); *H04W 76/021* (2013.01); *H04W 84/12* (2013.01)

(58) Field of Classification Search
CPC ..... H04W 12/08; H04W 48/14; H04W 48/16; H04W 48/20; H04W 52/0277; H04W 76/02; H04W 76/021; H04W 84/12
USPC ................. 370/254, 310, 311, 328, 329, 338
See application file for complete search history.

(56) References Cited

U.S. PATENT DOCUMENTS

| | | | | |
|---|---|---|---|---|
| 2012/0275443 A1* | 11/2012 | Shpak | ................... | H04W 76/02 370/338 |
| 2014/0086124 A1* | 3/2014 | Knowles | ........... | H04W 52/0277 370/311 |
| 2015/0223154 A1* | 8/2015 | Jeong | ................... | H04W 48/16 370/338 |

* cited by examiner

*Primary Examiner* — Kwang B Yao
*Assistant Examiner* — Harun Chowdhury
(74) *Attorney, Agent, or Firm* — Hewlett Packard Enterprise Patent Department

(57) ABSTRACT

Described herein are systems, methods and computer program products for controlling operation of wireless network devices, such as wireless access points and wireless client devices. The techniques described simplify the process of associating wireless devices with wireless networks. Wireless devices can associate with a wireless access point without knowing details of the wireless access point, such as a service set identifier (SSID). Upon associating with a wireless access point, client devices cease transmission of or reduce a transmission rate of wireless probe requests, resulting in more efficient wireless radio frequency use and reduced possibility of interference due to wireless probe request transmissions.

20 Claims, 10 Drawing Sheets

OPTIMIZING THE USE OF SHARED RADIO FREQUENCY MEDIUM USING INTELLIGENT SUPPRESSION OF PROBE REQUEST FRAMES

CROSS REFERENCE TO RELATED APPLICATIONS

Not applicable.

FIELD

The present disclosure generally relates to wireless network technologies and to wireless communication between devices. Specifically, various techniques and systems are provided for operation of and control of wireless access points and other wireless devices.

BACKGROUND

Various management frames are used for setup and maintenance of wireless networks and are exchanged between stations (STAs), such as client devices and infrastructure devices, for example, wireless access points and base stations. Management frames are useful for allowing devices to probe and determine certain characteristics about a wireless network, in addition to negotiation of a wireless connection. For example, management frames can be used to determine a presence of a wireless network, such as by use of beacon frames, probe request frames and probe response frames. Other management frames can be used to negotiate certain characteristics of a data connection, such as authentication and association, such as using authentication requests and responses and association request and responses. Other management frames will be known to and understood by the skilled artisan. Management frames may include source and destination address information, such as specified using media access control (MAC) addresses, as well as other information specified by or required by one or more standards. Management frames may be directed to a specific device (unicast), or to any device (broadcast), for example by using MAC addresses, as appropriate.

Management frames generally comply with one or more wireless networking standards, such as an Institute of Electrical and Electronics Engineers (IEEE) standard. For example, useful IEEE standards include, but are not limited to IEEE 802.11 standards, such as IEEE 802.11-2007, IEEE 802.11n, IEEE 802.11ac, and IEEE 802.11-2012. These standards are hereby incorporated by reference. Compliance with a wireless networking standard advantageously allows a wireless device to communicate with other wireless devices also compliant with the same standard.

Beacon frames are typically used to announce a presence of a wireless network. Beacon frames may be periodically transmitted by devices such as access points, range extenders, base stations, and other infrastructure devices. Beacon frames may further include information about the wireless network and/or infrastructure device, such as capabilities, network identifiers, channel/frequency information, supported data rates, and the like.

Probe request frames, also referred to herein as probe requests, are typically used to determine a presence of a wireless network, such as to determine which access points are within range of a client device. Probe requests may include information about the transmitter, typically a client device, such as MAC address information, capabilities, supported data rates, and the like.

A probe request may, for example, identify a target network by as using a network identifier, such as a basic service set identifier (BSSID) or service set identifier (SSID). Such a probe request is referred to herein as a directed probe request. Probe requests may also identify no network identifier. Such a probe request is referred to herein as a null probe request. Network devices typically transmit probe requests periodically when they are not associated with any wireless network, such as to determine if any known or unknown wireless networks are available or within range.

Probe response frames, also referred to herein as probe responses, are typically used by a wireless infrastructure device, such as a wireless access point or base station, to respond to a received probe request. Probe responses may include information about the base station and wireless network, such as capabilities, supported data rates, channel/frequency information, etc., as well as device identifiers identifiers, such as a MAC address, and network identifiers, such as a BSSID or an SSID.

Authentication frames, such as authentication requests and authentication responses, may be used by wireless devices to authenticate one another and/or to confirm encryption. Authentication requests and responses may comply with the simplest system, an open authentication system, or other authentication systems. Authentication frames may identify one or more parameters, such as a network identifier, authentication type, authentication status, etc.

Association frames, such as association request frames (association requests) and association response frames (association responses), are typically used by wireless devices to allocate resources and synchronize network communications, such as to allow for long term and/or repeated network communications. Association requests may include information about the transmitting and receiving devices, such as network identifiers or addresses. Association responses may also include identifying information, such as one or more MAC addresses, BSSIDs, etc., but generally also include information about whether the association is requested or rejected. If the association of a device is accepted, an association response may include an association ID (AID) assigned to the requesting device. Upon receiving an association response with an AID, a client device may be considered to be associated with and/or connected to the wireless access point that transmitted the association response.

SUMMARY

Described herein are techniques for controlling or reducing the rate at which wireless probe requests are transmitted by client devices and techniques for associating client devices with wireless access points. Client devices may transmit probe requests as they are searching for a known wireless network to connect to, such as a wireless network that the client device has connected to previously. For example, if a client device has connected to a wireless network, such as an open wireless network, a home wireless network or a corporate wireless network, the client device may store profile information associated with the wireless network connection for later reuse. When not connected to any wireless network, a client device may transmit probe requests to determine if a network associated with a stored profile is available.

A client device, upon becoming associated with an access point, may cease transmission of or reduce a transmission rate of probe request frames. The reduction in wireless transmissions associated with probe requests results in less wireless spectrum usage by a device for probing to see what wireless networks are available. Aspects described herein utilize this feature to optimize the use of the radio frequency (RF) medium to achieve improved performance, throughput, bandwidth of wireless data transmissions, etc.

In addition to the above optimized use of the RF medium, aspects described herein also allow for simplification of associating devices with a wireless access point. For example, in various aspects, client devices may not need to be provided with network information in order to become associated with a wireless access point. This may improve the user experience and reduce friction for network access for users, as a network device may automatically become associated with a wireless access point without any user intervention.

These and other advantages are achieved, in embodiments, by a wireless access point responding to probe requests that include network identifiers that identify virtually any network, including networks other than are associated with the access point, in order to begin the process for associating a client device with the wireless access point.

For example, in a first aspect, provided are methods, such as computer implemented methods. Method embodiments of this aspect are useful for associating network devices with a wireless access point, for example. In a specific embodiment, a method of this aspect comprises the steps of receiving a probe request at a wireless access point; determining whether the probe request is a directed probe request or a null probe request; determining a probe response; transmitting the probe response; receiving an association request; and transmitting an association response. In exemplary embodiments, receiving the association response at a client device causes the client device to associate with the wireless access point. For example, receiving the association response at a client device causes the client device to become associated with the wireless access point using a response network identifier or according to a response network identifier. In exemplary embodiments, the wireless access point includes an access point network identifier. Useful network identifiers include service set identifiers (SSIDs). In one embodiment, an access point network identifier is an SSID that has been assigned to the wireless access point. In one embodiment, the network identifier of the access point is hidden. For example, access points can operate such that the SSID of the access point is hidden and not broadcast, such as in a beacon frame. In exemplary embodiments, the access point does not include a network identifier uniquely associated with the access point, such as an SSID assigned to the access point, in a transmission, such as in one or more management frames.

In embodiments, probe requests include directed probe requests and null probe requests. For example, a directed probe request includes a probe network identifier, such as an SSID that is specified in the probe request. Optionally, a null probe request specifies a null network identifier or does not include a network identifier. Useful embodiments include, but are not limited to, those where a network identifier specified in a probe request is different from an access point network identifier. Optionally, a probe request is a broadcast probe request. For example a broadcast probe request may specify a broadcast destination address, such as a media access control (MAC) address of FF-FF-FF-FF-FF-FF. Optionally, receiving a wireless probe request at a wireless access point causes the wireless access point to transmit a probe response.

In embodiments, determining a probe response includes determining a response network identifier for use in the probe response. Useful response network identifiers include network identifiers that are different from an access point network identifier. For example, in some embodiments, the probe request is a directed probe request and includes a probe network identifier and a response network identifier included in the probe response is the probe network identifier, such as a probe network identifier that is different from the access point network identifier. Optionally, the probe request is a null probe request and a response network identifier included in the probe response is the a default network identifier, such as a network identifier that is selected from a list of predetermined network identifiers, for example, a predetermined network identifiers that is different from the access point network identifier. Optionally, receiving a probe response at a client device causes the client device to transmit an association request. In an embodiment, a probe response includes basic service set identifier (BSSID)

Optionally, an access point transmits multiple probe responses, such as in response to receiving a single null probe request. For example, in an embodiment, an access point transmits a first probe response to a null probe request and a second probe response to the null probe request. Optionally, network identifiers included in the first probe response and the second probe response are different. In an embodiment, each of the first and second probe responses includes different SSIDs, though both the first and second probe responses may include the same BSSID.

Optionally, an access point transmits multiple probe responses, such as in response to receiving multiple probe requests. For example, in one embodiment, an access point receives a probe request including a first SSID from a first client device and a second probe request including a second SSID from a second client device, with the first SSID and the second SSID being different from one another. Optionally, both the first SSID and the second SSID will be different from an SSID uniquely assigned to the access point. In embodiments, the access point will transmit a first probe response to the first client device that includes the first SSID and a second probe response to the second client device that includes the second SSID. In this way, multiple client devices may associate with the access point using different SSIDs. In some embodiments, an access point may support associating with hundreds or thousands of client devices and each client device may use an SSID unique from that used by all other client devices. Optionally, a first probe request includes a network identifier that is different from an access point network identifier or includes no network identifier, while a second probe request includes a network identifier that is the same as the acces point network identifier. In such an embodiment, the access point will, optionally, transmit a first probe response that includes a network identifier that is different from the access point network identifier and also transmit a second probe response that includes the access point network identifier.

In embodiments, an association request includes the response network identifier. Optionally, an association request includes a station identifier for a client device, such as a MAC address for the client device. Optionally, receiving an association request at a wireless access point causes the wireless access point to transmit an association response. In embodiments, an association response includes an association identifier for a client device having the station identifier. Optionally, receiving the association identifier at a client device having the station identifier causes the client device to become associated with the wireless access point. For example, in one embodiment, receiving the association identifier at a client device having the station identifier causes the client device to become associated with the wireless access point using a response network identifier, such as a response network identifier included in an association request. In various embodiments, receiving the association identifier at a client device having the station identifier causes the client device to reduce a transmission rate of or cease transmissions of probe requests.

In embodiments, the methods described above optionally further comprise additional steps. For example, in one embodiment, a method of this aspect further comprises receiving a beacon frame, such as a beacon frame that includes a neighboring network identifier; and storing the neighboring network identifier in a list of neighboring networks. Optionally, probe requests including neighboring network identifiers on the list are ignored. Optionally, a list of neighboring networks is periodically updated and network identifiers on the list may be removed if beacon frames from those neighboring networks are no longer received, such as after a specified time threshold, for example a period of hours or days.

In embodiments, for example, methods of this aspect further comprise comparing the probe network identifier with a list of excluded network identifiers. Optionally, probe requests including probe network identifiers on the list of excluded network identifiers are ignored. Optionally, wildcard network identifiers are included on the list of excluded network identifiers and probe requests including probe network identifiers that match any portion of a wildcard network identifier on the list of excluded network identifiers are ignored.

In embodiments, methods of this aspect further comprise receiving a wireless authentication request, such as a wireless authentication request that includes a station identifier; and transmitting a wireless authentication response including the station identifier. Optionally, the wireless authentication response indicates whether authentication was successful. In various embodiments, receiving a wireless authentication response at a client device having the station identifier causes the client device to transmit an association request.

The skilled artisan will understand the various authentication messages exchanged between devices. Generally, for unsecured wireless networks, an open authentication system is used. In some embodiments, an open authentication system will exchange information between devices, such as MAC addresses and/or other identifying information. If a client device, identified by a MAC address, is allowed to authenticate with an access point, for example, the access point will respond to an authentication request with an authentication response indicating successful authentication. In some situations, a client device's MAC address will be compared with a list of allowed MAC addresses and/or a list of excluded MAC addresses. If the client device's MAC address is not allowed and/or is excluded, for example, the access point will respond to an authentication request with an authentication response indicating failed authentication.

In some embodiments, a client device will include a profile for a wireless network connection, such as a profile for a previously used wireless network connection. Optionally, this stored profile may identify a previously used authentication system. In some embodiments, if such a client device attempts to connect to a wireless access point using a stored wireless network profile, the connection may not be successful, as the authentication step described above may fail, as the access point may respond with a different type of authentication than was identified in the profile. For example, a wireless access point may receive an authentication request that identifies a specific type of authentication. Optionally, the access point may respond with a different type of authentication and the client device will not proceed to transmission of an association request. In other embodiments, however, a client device may proceed with transmission of an association request even though the authentication type in the authentication request and the authentication response do not match.

In other aspects, systems are provided, such as systems for performing the methods described herein. In exemplary embodiments, a system of this aspect comprises one or more processors, and a non-transitory computer readable storage medium communicatively coupled or otherwise positioned in data communication with the one or more processors. In embodiments, the non-transitory computer readable storage medium includes instructions that, when executed by the one or more hardware processors, cause the one or more hardware processors to perform one or more of the methods described herein.

Optionally, a user experience may be controlled for devices which have authenticated with a wireless access point using the methods described herein. For example, in one embodiment, a request for a network service may be received by the wireless access point, such as from a client device that has completed association with the access point, for example an HTTP request or other network service request. Optionally, instead of completing the HTTP request by forwarding the request to its intended destination, the access point returns a landing page, which may be presented to the user by the client device. Useful landing pages include, but are not limited to, those that identify the network connection as provided by the access point. In embodiments, a landing page is transmitted by the access point only a single time, such as upon receiving a first network service request from a recently associated client device.

In embodiments, a landing page is transmitted that is configured to receive user input. Optionally, the access point may receive a data transmission including data entered into a landing page, such as by a user. For example, the landing page may request further authentication, such as login credentials, email address, etc. Data entered into the landing page by a user may be transmitted by the client device to the access point, which then receives the data and operates on the data further. As another example, the landing page may require acknowledgment, such as by receiving input corresponding to a button press on a webpage, before access to a network is provided. Optionally, the SSID used for the connection is included in the landing page, for example, so as to inform the user that the connection to the SSID specified is being provided by an alternate network rather than the provider normally providing the connection identified by the SSID. Optionally, the landing page may include an option to receive input for disabling or opting out a client device from associating with the access point. For example, the landing page may include a form or check box that transmits data, which is received by the access point, that indicates that the client device should be opted out from automatic association with the access point.

In other aspects, computer program products are provided, such as computer program products configured to achieve methods described herein. In exemplary embodiments, a computer program product of this aspect is a non-transitory computer readable storage medium comprising instructions that, when executed by one or more hardware processors, cause the one or more hardware processors to perform one or more of the methods described herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

Illustrative embodiments of the present invention are described in detail below with reference to the following drawing figures.

DETAILED DESCRIPTION

Figure 1:
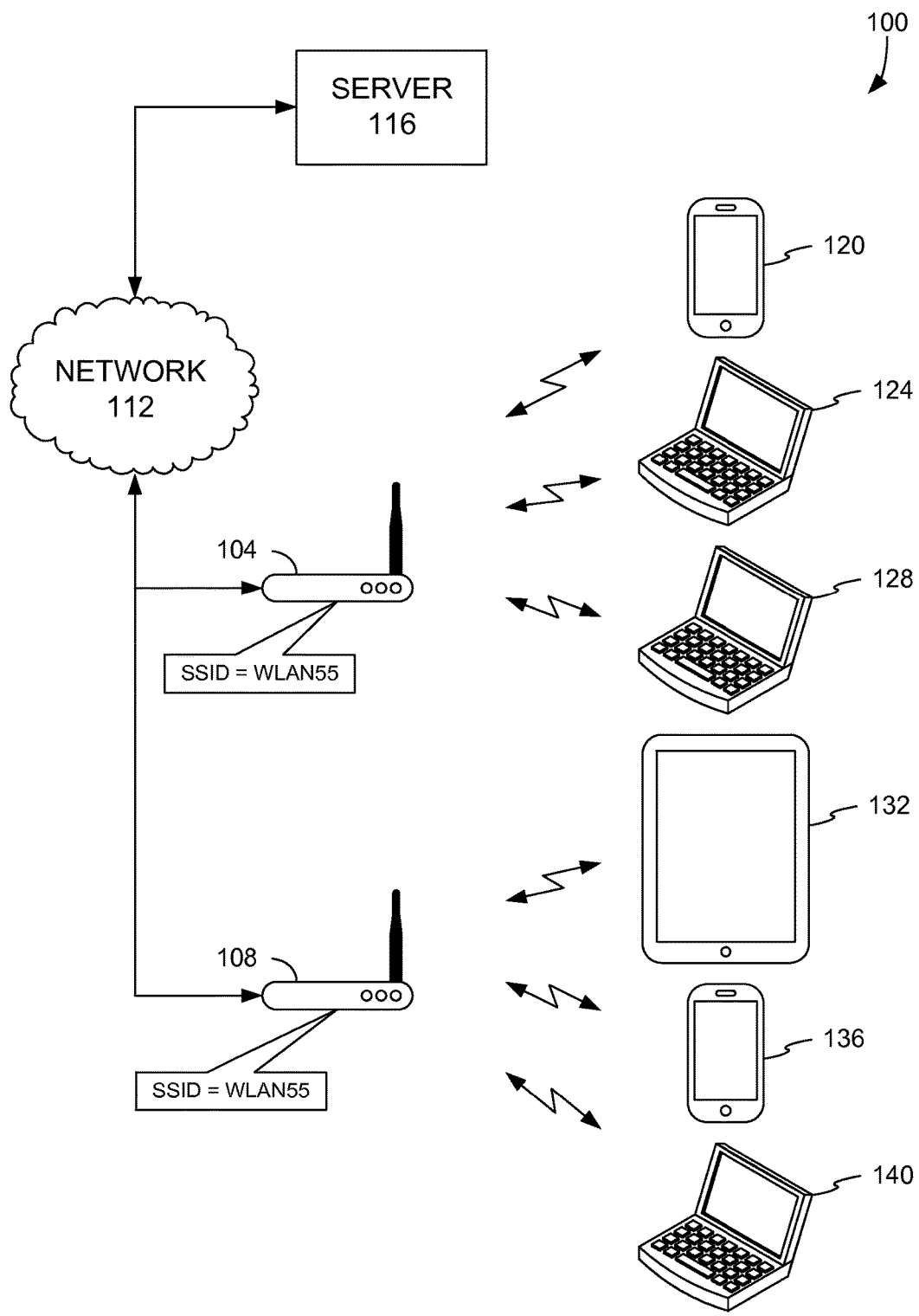
FIG. 1 provides an illustration of an example network communications environment, in accordance with some embodiments.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, an algorithm, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Various techniques for controlling or reducing the rate at which wireless probe requests are transmitted by client devices are described herein. Client devices may transmit probe requests as they are searching for a known wireless network to connect to, such as a wireless network that the client device has connected to previously. For example, if a client device has connected to a wireless network, such as an open wireless network, a home wireless network or a corporate wireless network, the client device may store profile information associated with the wireless network connection for later reuse. When not connected to any wireless network, a client device may transmit probe requests to determine if a network associated with a stored profile is available.

When transmitting a probe request, a client device may scan through a variety of wireless channels, transmitting one or more probe requests on each channel. For example, a client device may transmit a plurality of probe requests on a first wireless channel, such as a plurality of probe requests each identifying a network identifier, such as a service set identifier (SSID). For example, in one embodiment, a client device may transmit a plurality of Institute of Electrical and Electronics Engineers (IEEE) 802.11 compliant management frames configured as probe requests on channel 1 in the 2.4 GHz wireless band, such as to determine whether any of a plurality of wireless networks are operating on this channel in a detectable range. Operation in other radio frequency bands is also possible, such as a 5 GHz band. Upon determining that no wireless networks or no desired wireless networks are operating on this channel, the client device may switch to another channel, such as channel 2 or channel 6 in the 2.4 GHz wireless band, and transmit additional probe requests that seek to find one or more wireless networks. Each probe request transmission occupies a wireless channel for a period of time and can result in reduced effective usage of the wireless channel during that time, as other devices cannot effectively transmit simultaneously.

As client devices, which are not in the presence of any known wireless networks, continually or periodically transmit probe requests, the preoccupation of wireless channels can congest wireless transmissions while multiple client devices are all transmitting probe requests. Such a situation can result, for example, in a denial-of-service type situation when many client devices are probing for wireless networks. For example, at a large venue event, such as at a sporting event, conference, concert, etc., many thousands of wireless client devices may be present, such as smartphones, tablets, laptop computers, and other wireless devices. While many of the client devices that are present are probing for wireless networks, congestion may ensue, reducing the effective usage of the wireless medium.

By controlling or reducing the rate at which probe requests are transmitted, the overall usage of the wireless medium may be optimized for more useful transmissions, such as data packet transmissions used for data other than probe requests.

FIG. 1 provides an illustration of an example network communications environment 100, in accordance with some embodiments. In FIG. 1, a first wireless access point 104 and a second wireless access point 108 connect to a network 112. Network 112 may be a local network, a corporate network, a wide area network, the Internet, etc., without limitation. Access point 104 and access point 108 are optionally interconnected to one another, for example directly or using one or more intermediary network devices, such as switches, routers and hubs. Network communications environment 100 further includes network devices 120, 124 and 128 associated with access point 104 and network devices 132, 136 and 140 associated with access point 108. A server 116 is also shown as a component of network communications environment 100. Network connections between network communications environment 100 may be wired and/or wireless.

In the embodiment shown, access point 104 and access point 108 both use a common network identifier, such as a service set identifier (SSID) of WLAN55. As will be understood by the skilled artisan, WLAN55 is merely an example SSID and any other SSID could be utilized. Additionally, different SSIDs can be used for each of access point 104 and access point 108. Advantageously, use of a common SSID by access point 104 and access point 108 allows the creation of an extended logical wireless network, such as commonly referred to as a wireless network using an extended service set identifier (ESSID). In this way, network devices 120, 124, 128, 132, 136 and 140 can associate with either of access point 104 or access point 108. In an exemplary embodiment, access points 104 and 108 are compliant with one or more wireless standards, such as an IEEE 802.11 standard, for example 802.11n, 802.11ac, or 802.11-2012.

As illustrated, network devices 120 and 136 are represented as smartphones, network device 132 is represented as a tablet computer, and network devices 124, 128 and 140 are represented as laptop computers. Other network devices are capable of wirelessly associating with access points 104 and 108, such as, but not limited to, smart watches, smart appliances, personal computers, wireless bridges, and other wireless network devices.

In various embodiments, access points 104 and 108 include hardware allowing for wired network connections, such as wired network connections compliant with an IEEE 802.3 standard, such as fast Ethernet or gigabit Ethernet. Although not shown, network communications environment 100 may optionally include additional network devices, such as network devices including, but not limited to routers, gateways, modems, hubs, switches, firewalls, etc., as will be understood by the skilled artisan.

Additionally, network communications environment 100 may include one or more servers, client devices, access devices, such as using wired and/or wireless network connections. For example, server 116 may represent any computer server system connected to network 112 and accessible by any device in communications environment 100. For example, server 116 may be an Internet server, such as a webserver, an application server, or other network attached computing device or an Internet connected personal computer. In an exemplary embodiment, server 116 is or includes a controller for managing one or more of the network devices in communications environment 100. For example, server 116 may include a controller for managing access point 104 and/or access point 108. Optionally, a controller may be included on one or both of access point 104 and access point 108 or any other network device in network communications environment 100. Server 116 may, optionally, provide an interface for management of access point 104 and/or access point 108.

Figure 2A:
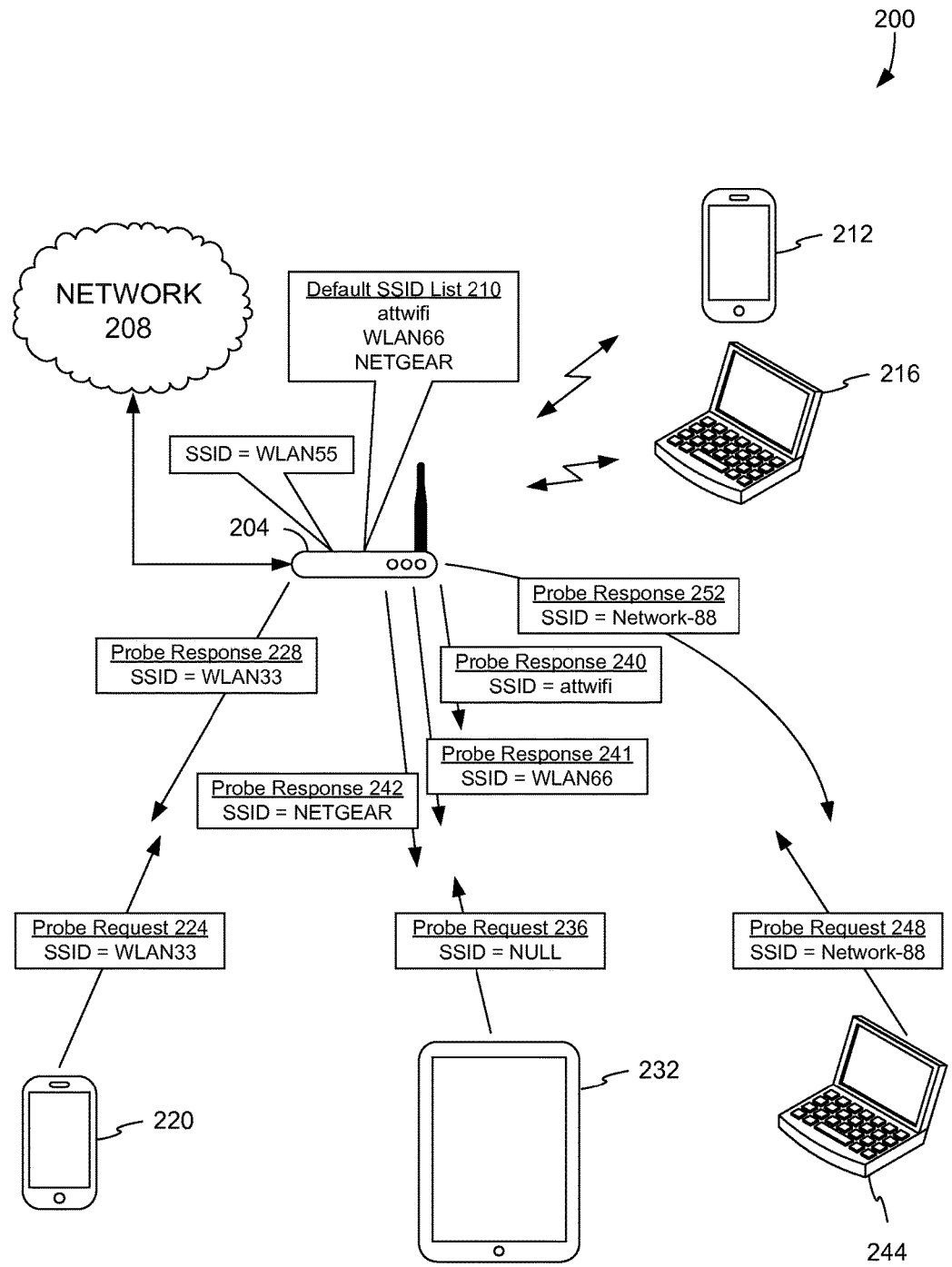
FIG. 2A and FIG. 2B provide illustrations of an example wireless communications environment, in accordance with some embodiments.
Figure 2B:
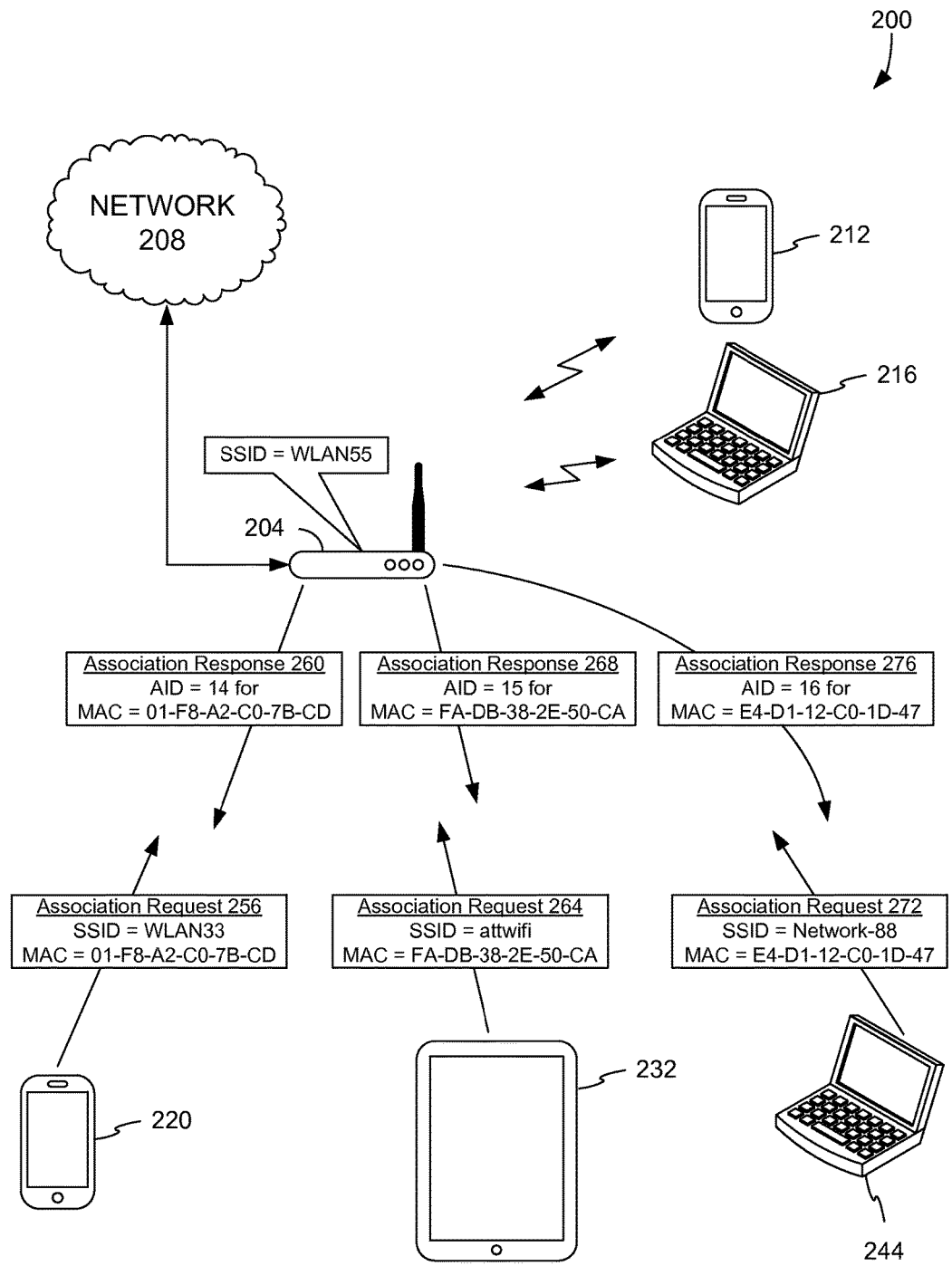

FIGS. 2A and 2B provide illustrations of an example wireless communications environment 200. Here, wireless access point 204 connects to a network 208. Network devices 212 and 216 are associated with wireless access point 204, shown as assigned an SSID of "WLAN55." As described above, this SSID is merely exemplary and other SSIDs can be used. Wireless access point is available for other network devices to connect to and provide wireless network access to network 208. As shown in FIG. 2A, to establish a wireless network connection, a smartphone 220, may transmit a probe request 224 to determine whether any wireless connections are available. For example, in some embodiments, a wireless probe request is a broadcast probe request, such as would be addressed to any and all nearby wireless access points available to make wireless connections. The skilled artisan will understand the format and process of establishing a wireless network connection, such as an IEEE 802.11 compliant wireless connection.

As illustrated, probe request 224 is a directed probe request and identifies an SSID that the smartphone 220 attempts to see if is available, namely an SSID of "WLAN33". Although the wireless access point 204 has been assigned an SSID of "WLAN55", wireless access point 204 nevertheless responds with a probe response 228 that includes the SSID WLAN33. In this way, wireless access point 204 is indicating to smartphone 220 that the WLAN33 network is available. As will be understood by the skilled artisan, network devices, such as smartphone 220, may store previously used network connections for later reuse. Here, an SSID of WLAN33 is stored by smartphone 220, as smartphone either previously connected to a wireless network having the SSID of WLAN33 or may have otherwise stored a wireless profile that identifies the SSID of WLAN33.

Other probe requests can be generated by other wireless network devices and used to solicit probe responses from wireless access points. For example, probe request 236 is transmitted by tablet 232. In this instance, probe request 236 is a null probe request and does not identify any specific wireless access point by SSID but instead can be understood as requesting that available wireless access points respond with their SSID. Again, instead of responding with the assigned SSID of WLAN55, access point 204, after receiving probe request 236 responds with a different SSID. Optionally, access point 204 responds to the null probe request 236 with multiple probe responses, such as one or more distinct SSIDs. In FIG. 2, access point 204 transmits probe response 240, probe response 241, and probe response 242. As illustrated, each of probe responses 240, 241, and 242 include SSIDs different from one another and different from the SSID assigned to the access point 204. Here, access point 204 responds with a default SSID, such as "attwifi", in probe response 240, a different default SSID, such as "WLAN66", in probe response 241, and a different default SSID, such as "NETGEAR", in probe response 242. As described above, other SSIDs can be used for the probe response 240, 241, and 241. Optionally, additional information included in probe responses 240, 241, and 242, such as BSSID information, MAC address information, may be the same or different between and probe response 240, probe response 241, and probe response 242.

In various embodiments, the default SSIDs included in probe responses 240, 241, and 242 are selected from a list, such as a predetermined list 210 of default SSIDs. SSIDs on the list 210, for example, may be arbitrarily selected, such as the SSID of "WLAN66". Optionally, probe responses are generated for each SSID on list 210. Optionally, probe responses are generated for only a subset of the SSIDs on list 210. Optionally, a list of default SSIDs may include list members that would likely encourage a wireless device to further associate with the access point 204. For example, SSIDs on the predetermined list may include those matching network providers in the area, such as those used by coffeehouses, such as "Google Starbucks WiFi" or "PEETS," those used by Internet service providers, such as "xfinitywifi" or "TWCwifi", those used by cellular service providers, such as "attwifi" or "tmobile", those used by network hardware manufacturers, such as "dlink" or "NETGEAR", or SSIDs advertising open and/or free wireless access, such as "Free Public WiFi". A goal of the use of such SSIDs, in some embodiments, may be to attract as many network devices as possible to connect to the wireless access points. Optionally, the list of SSIDs may be populated with one or more SSIDs that are determined to be repeatedly used by devices which connect to access point 204. A benefit of network devices associating with the access point 204 will be to minimize the repeated transmission of probe requests by client devices, which results in inefficient use of wireless spectral resources.

As illustrated in FIG. 2A, laptop computer 244 further transmits a probe request 248 that includes an SSID of "Network-88." After receiving probe request 248, wireless access point responds with a probe response 252 that includes the SSID of "Network-88."

In order to establish a wireless network connection between a wireless client device and a wireless access points (also referred to herein as "association"), other data exchanges may occur. For example, although not shown, the skilled artisan will understand that one or more wireless acknowledgement packets may be communicated between devices. For example, a wireless acknowledgment response may be transmitted by a wireless device upon receiving a wireless probe response. Additionally, other data exchanges may be required, such as to negotiate authentication and association.

FIG. 2B illustrates the process of association of wireless devices 220, 232 and 244 with wireless access point 204 E4-D1-12-C0-1D-47. For example, smartphone 220 may transmit association request 256. Association request 256 may include the previously identified SSID of WLAN33 that was communicated in probe response 228. The association request 256 may also include a station identifier of the smartphone 220. For example, the media access control (MAC) address of the smartphone of 01-F8-A2-C0-7B-CD may be included in the association request 256. As will be understood by the skilled artisan, the MAC addresses shown herein are merely exemplary and, optionally, match the MAC addresses assigned to the respective network devices. In some instances, however, a false or temporary MAC address may be used by a network device, such as to provide enhanced security or to minimize device tracking, for example. In some embodiments, other station identifiers are used besides a MAC address.

After receiving association request 256, wireless access point 204 may transmit an association response 260. As will be understood by the skilled artisan, for example, an association response may include additional information used by a client device and an access point to establish an association between the devices. For example, an association identifier (AID) may be used to identify the association. Here, association response 260 includes an AID with an assigned value of 14 for the device having MAC address 01-F8-A2-C0-7B-CD (i.e., smartphone 220). Receiving the AID will signify to smartphone 220 that its association request to the wireless access point 204 is granted (i.e., that smartphone 220 is now associated with access point 204) and it can thereafter transmit wireless data, as necessary, to access point 204. A benefit of the association is that smartphone 220 will cease transmission of or reduce a transmission rate of probe requests.

Tablet 232 may transmit association request 264 including the previously identified SSID that was communicated in probe response 240 of attwifi. The association request 264 also includes a MAC address of the tablet 232 of FA-DB-38-2E-50-CA. After receiving association request 264, wireless access point 204 transmits an association response 268 that includes an AID with an assigned value of 15 for the device having MAC address FA-DB-38-2E-50-CA (i.e., tablet 232). Receiving the AID will signify to tablet 232 that its association request to the wireless access point 204 is granted (i.e., that tablet 232 is now associated with access point 204 using SSID attwifi) and it can thereafter transmit wireless data, as necessary, to access point 204. A benefit of the association is that tablet 232 will cease transmission of or reduce a transmission rate of probe requests.

Similarly, laptop 244 may transmit association request 272 including the previously identified SSID that was communicated in probe response 252 of Network-88. The association request 272 also includes a MAC address of the laptop 244 of E4-D1-12-C0-1D-47. After receiving association request 272, wireless access point 204 transmits an association response 276 that includes an AID with an assigned value of 16 for the device having MAC address E4-D1-12-C0-1D-47 (i.e., laptop 244). Receiving the AID will signify to laptop 244 that its association request to the wireless access point 204 is granted (i.e., that laptop 244 is now associated with access point 204) and it can thereafter transmit wireless data, as necessary, to access point 204. A benefit of the association is that laptop 244 will cease transmission of or reduce a transmission rate of probe requests.

Figure 3:
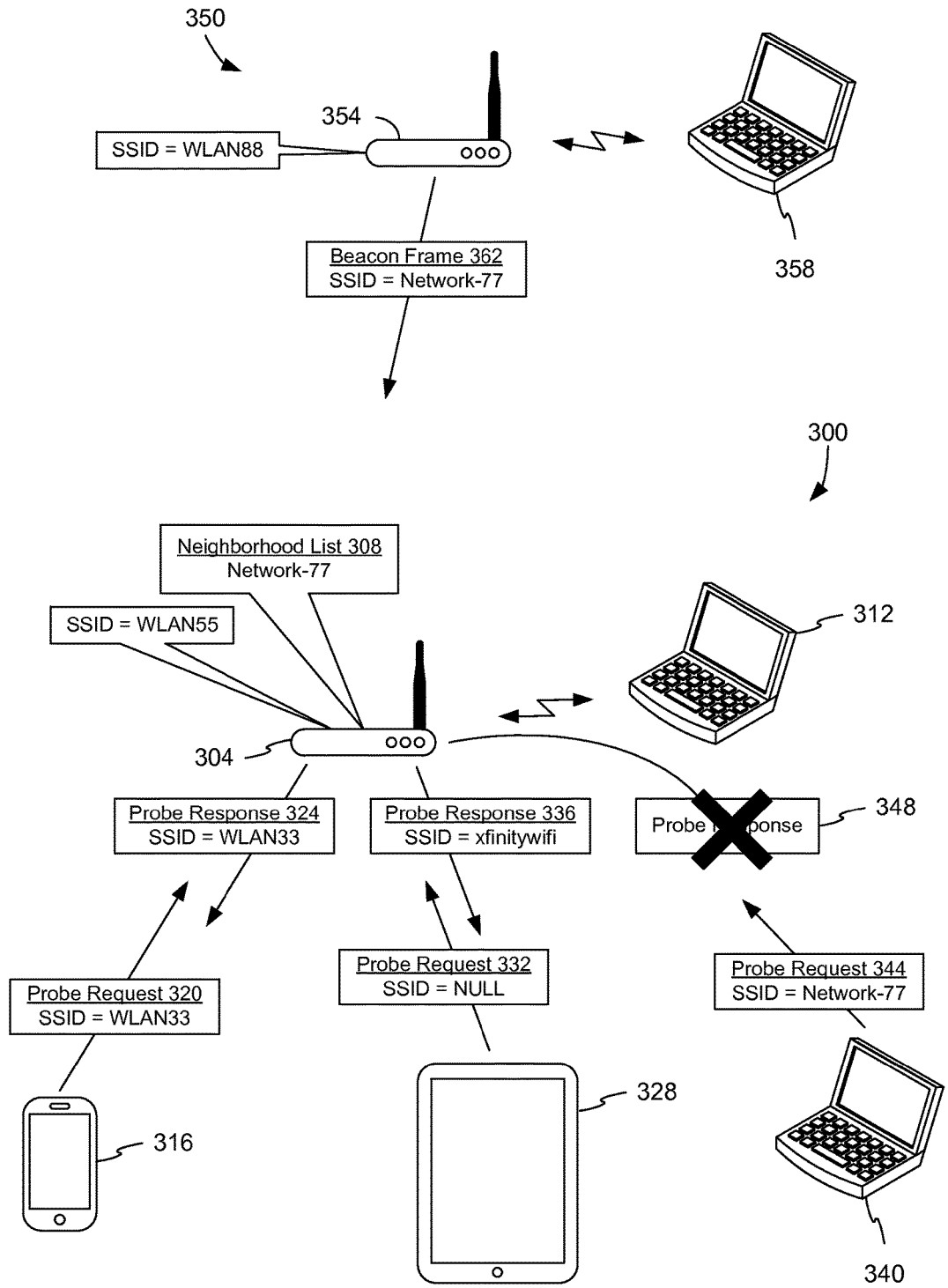
FIG. 3 provides an illustration of an example wireless communications environment, in accordance with some embodiments.

FIG. 3 provides an illustration of an example wireless communications environment 300 and neighboring communications environment 350. Although not shown, for simplicity, wireless access point 304 optionally connects to a network, such as the Internet or a corporate network. Network device 312 is associated with wireless access point 304. Wireless access point is assigned an SSID of "WLAN55." Wireless access point is available for other network devices to connect to and provide wireless access to the network.

The neighboring communications environment 350 may be a network that is not associated with and/or directly connected to communications environment 300. As an example, neighboring communications environment 350 may represent a network that is operated by another entity in the vicinity of communications environment 300, such as a network operated by a small business, network service provider, individual, etc. In neighboring communications environment, wireless access point 354 is associated with laptop 358 and is assigned an SSID of "Network-77." As described above, this SSID is merely exemplary, and other SSIDs may be encountered in practice, such as "xfinity," "attwifi," or any other SSID. Wireless access point 354 may optionally be connected to another network (not shown), such as a local area network or the internet. Wireless access point 354 may transmit a beacon frame 362, such as to announce a presence or availability of the wireless service provided by wireless access point 354. As will be understood by the skilled artisan, beacon frames may include an SSID of the access point—illustrated in FIG. 3 as an SSID of Network-77.

Upon receiving the beacon frame 362 at wireless access point 304, the access point 304 may add the SSID included in the beacon frame 362 to a neighborhood list 308. Maintaining a neighborhood list is useful for tracking other networks operating in the vicinity of access point 304. This information can be advantageously used by access point 304 to ensure that devices which are attempting to connect to access point 354 are not inadvertently or erroneously directed to access point 304.

As shown in FIG. 3, a smartphone 316 may transmit a directed probe request that identifies an SSID that the smartphone 220 would connect to, if present, namely an SSID of "WLAN33". Although the wireless access point 304 has been assigned an SSID of "WLAN55", and since WLAN33 does not appear on the neighborhood list 308, wireless access point 304 responds with a probe response 324 that includes the SSID WLAN33. Additionally, probe request 332 is transmitted by tablet 328. In this instance, probe request 332 is a null probe request and does not identify any specific wireless access point by SSID. Again, instead of responding with the assigned SSID of WLAN55, access point 304, after receiving probe request 332 responds with a different SSID in probe response 336. Here, access point 304 responds with a default SSID, such as "xfinity-wifi", which may be selected from a list, such as a predetermined list of default SSIDs.

As illustrated in FIG. 3, laptop computer 340 further transmits a probe request 344 that includes an SSID of Network-77. After receiving probe request 344, wireless access point 304 identifies this SSID as a member of the neighborhood list and no probe response is transmitted by access point 304 in response to probe request 344, as illustrated at 348. If the probe request 344 is received at access point 354, access point 354 may transmit its own probe response and laptop 340 may attempt communications with access point 354 instead of access point 304. In this way, access point 304 does not associate with network device 340, which appears to be attempting to associate with access point 354.

Figure 4:
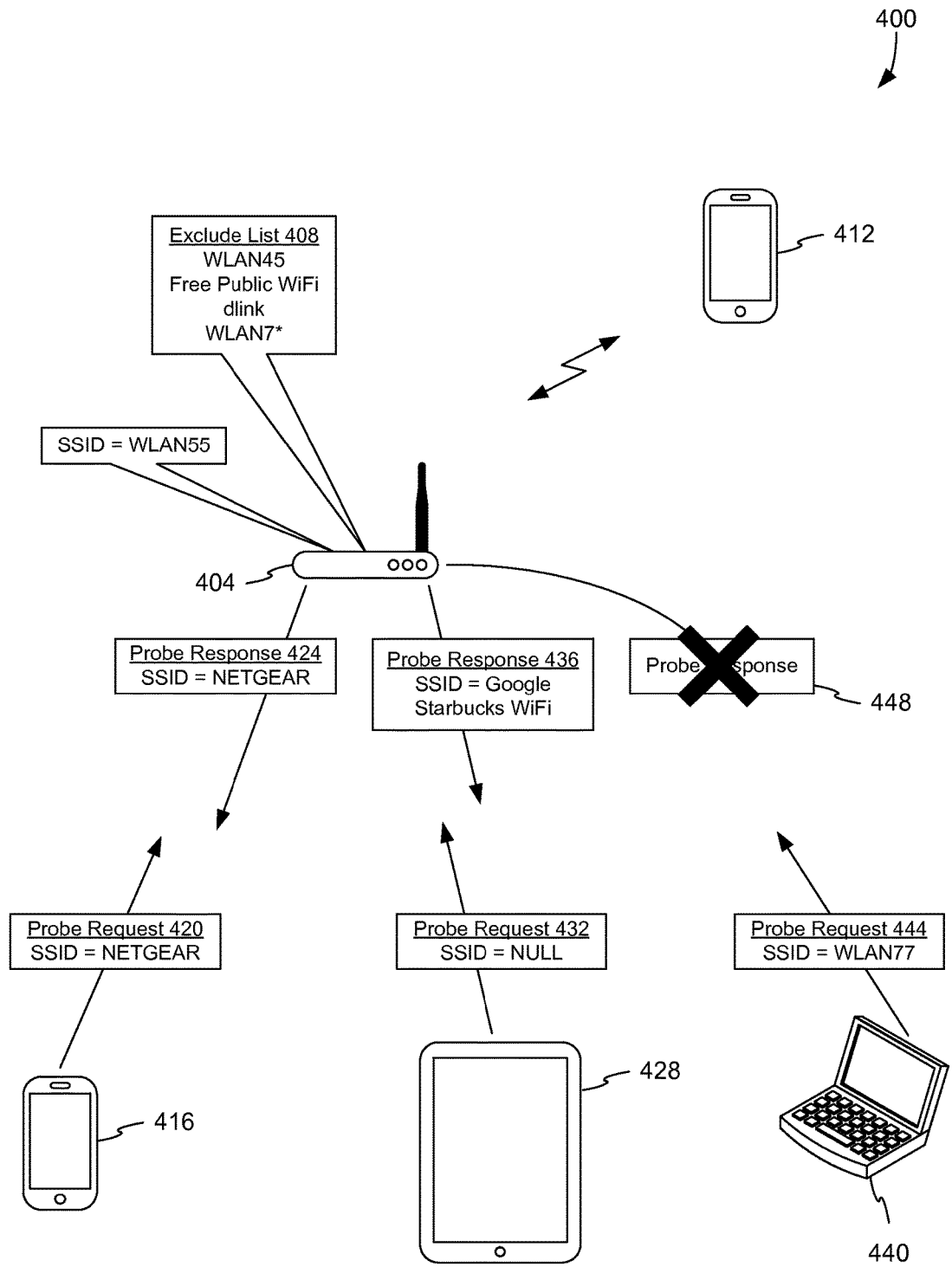
FIG. 4 provides an illustration of an example wireless communications environment, in accordance with some embodiments.

FIG. 4 provides an illustration of an example wireless communications environment 400. Although not shown, for simplicity, wireless access point 404 optionally connects to a network, such as a corporate network, local area network, or the Internet. Network device 412 is associated with wireless access point 404. The wireless access point is assigned an SSID of "WLAN55." The wireless access point is available for other network devices to connect to and may provide wireless network access to such devices.

As illustrated, wireless access point 404 maintains an exclude list 408. An exclude list includes, for example, SSIDs that access point 404 will ignore. For example, if access point 404 receives a probe request including an SSID on the exclude list 408, access point 404 may ignore the probe request and generate no probe response. SSIDs on the exclude list may include predetermined SSIDs, such as those identified by a user, such as "WLAN45." Exclude list may automatically populate the list with specific SSIDs, such as SSIDs which are known to be used for networks operating in the vicinity of access point 404 or SSIDs which are identified to be problematic, such as SSIDs which have been used by client devices that, for any reason or no reason, fail to establish an association with access point 404. For example "Free Public WiFi" may represent an automatically identified problematic SSID that is added to exclude list 408. Exclude list may further include wildcards, as illustrated by SSID "WLAN7*." Here the asterisk (*) character represents a wildcard, such that any SSID beginning with WLAN7 will match the entry, such as an SSID of WLAN74, an SSID of WLAN77832, etc. Other wildcards may be used, such as a wildcard character at the beginning, middle and/or end of an SSID, such as *WLAN45 or WLAN*5 or *LAN7*.

As shown in FIG. 4, smartphone 416 transmits a directed probe request that identifies an SSID that the smartphone 420 would connect to, if present, namely an SSID of "NETGEAR". Although the wireless access point 404 has been assigned an SSID of "WLAN55", wireless access point 404 responds with a probe response 424 that includes the SSID of NETGEAR. Additionally, probe request 432 is transmitted by tablet 428. In this instance, probe request 432 is a null probe request and does not identify any specific wireless access point by SSID. Again, instead of responding with the assigned SSID of WLAN55, access point 404, after receiving probe request 432 responds with a different SSID in probe response 436. Here, access point 404 responds with a default SSID, such as "Google Starbucks WiFi", which may be selected from a list, such as a predetermined list of default SSIDs.

As illustrated in FIG. 4, laptop computer 440 further transmits a probe request 444 that includes an SSID of WLAN77. After receiving probe request 444, wireless access point identifies this SSID as matching an entry on the exclude list, i.e., the entry of WLAN7*, and no probe response is transmitted in response to probe request 444, as illustrated at 448.

Figure 5A:
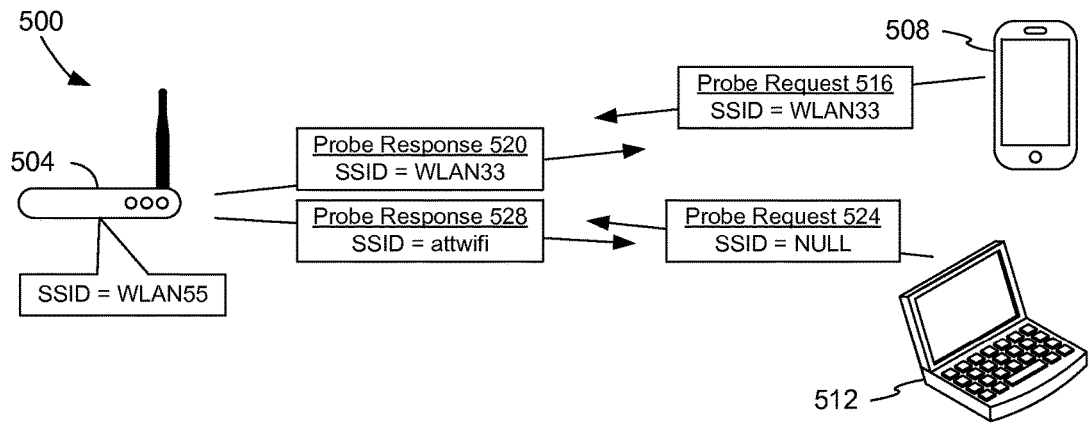
FIG. 5A, FIG. 5B and FIG. 5C provide illustrations of an example wireless communications environments, in accordance with some embodiments.
Figure 5B:
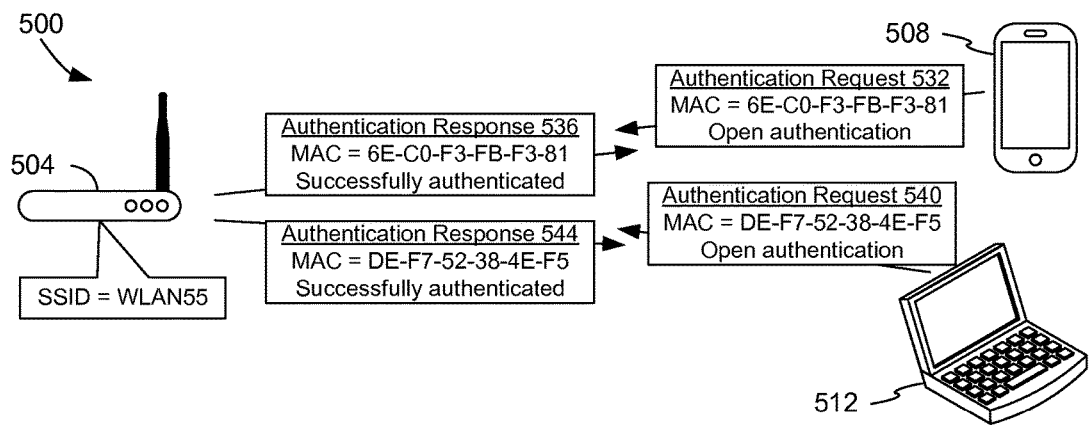
Figure 5C:
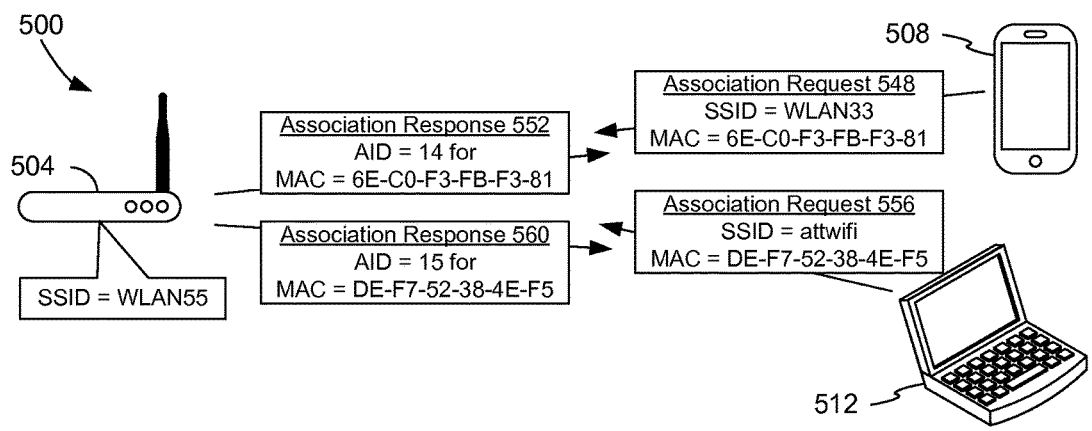

FIG. 5A, FIG. 5B and FIG. 5C provide illustrations of an example wireless communications environment 500 including access point 504, smartphone 508 and laptop 512. Access point 504 is shown as being assigned an SSID of WLAN55. FIGS. 5A-5C illustrate the exchange of certain transmissions used in the process of associating a client device with the access point 504, such as smartphone 508 or laptop 512.

The skilled artisan will understand that certain details about the management frames described herein are left out of the figures for clarity, but will be nevertheless included in the data frames as required by a wireless network communications protocol specification, such as an IEEE 802.11 specification. Examples may include transmission/destination addresses, control information, sequence information, status information, basic service set identifier (BSSID), capability information, rate information, and the like. Further, the skilled artisan will understand that various acknowledgment packets may also be transmitted by various devices in response to the reception of a management frame, but are not shown in the figures to ease understanding of aspects of the invention.

In FIG. 5A, smartphone 508 transmits directed probe request 516, which specifies an SSID of WLAN33. Access point transmits a probe response 520 to smartphone 508 that includes the SSID of WLAN33, and not the SSID assigned to the access point of WLAN55. Laptop 512 transmits a null probe request 524. Access point transmits a probe response 528 to laptop 512 that includes the SSID of attwifi, which may be selected from a default list, and not the SSID assigned to the access point of WLAN55.

In FIG. 5B, smartphone 508 transmits authentication request 532, which includes the MAC address of smartphone 508. Access point 504 receives authentication request 532 and then transmits an authentication response 536 to smartphone 508 that indicates successful authentication, such as using open access authentication. Similarly, laptop 512 transmits authentication request 540, which includes the MAC address of laptop 512. Access point 504 receives authentication request 540 and then transmits an authentication response 544 to laptop 512 that indicates successful authentication.

In FIG. 5C, smartphone 508 transmits association request 548, which includes the SSID WLAN33 and the MAC address of smartphone 508. Access point 504 receives association request 548 and then transmits an association response 552 to smartphone 508 that includes an AID of 14, signifying that smartphone 508 is now associated with access point 504. Similarly, laptop 512 transmits association request 556, which includes the SSID attwifi and the MAC address of laptop 512. Access point 504 receives association request 556 and then transmits an association response 560 to laptop 512 that includes an AID of 15, signifying that laptop 512 is now associated with access point 504.

Figure 6:
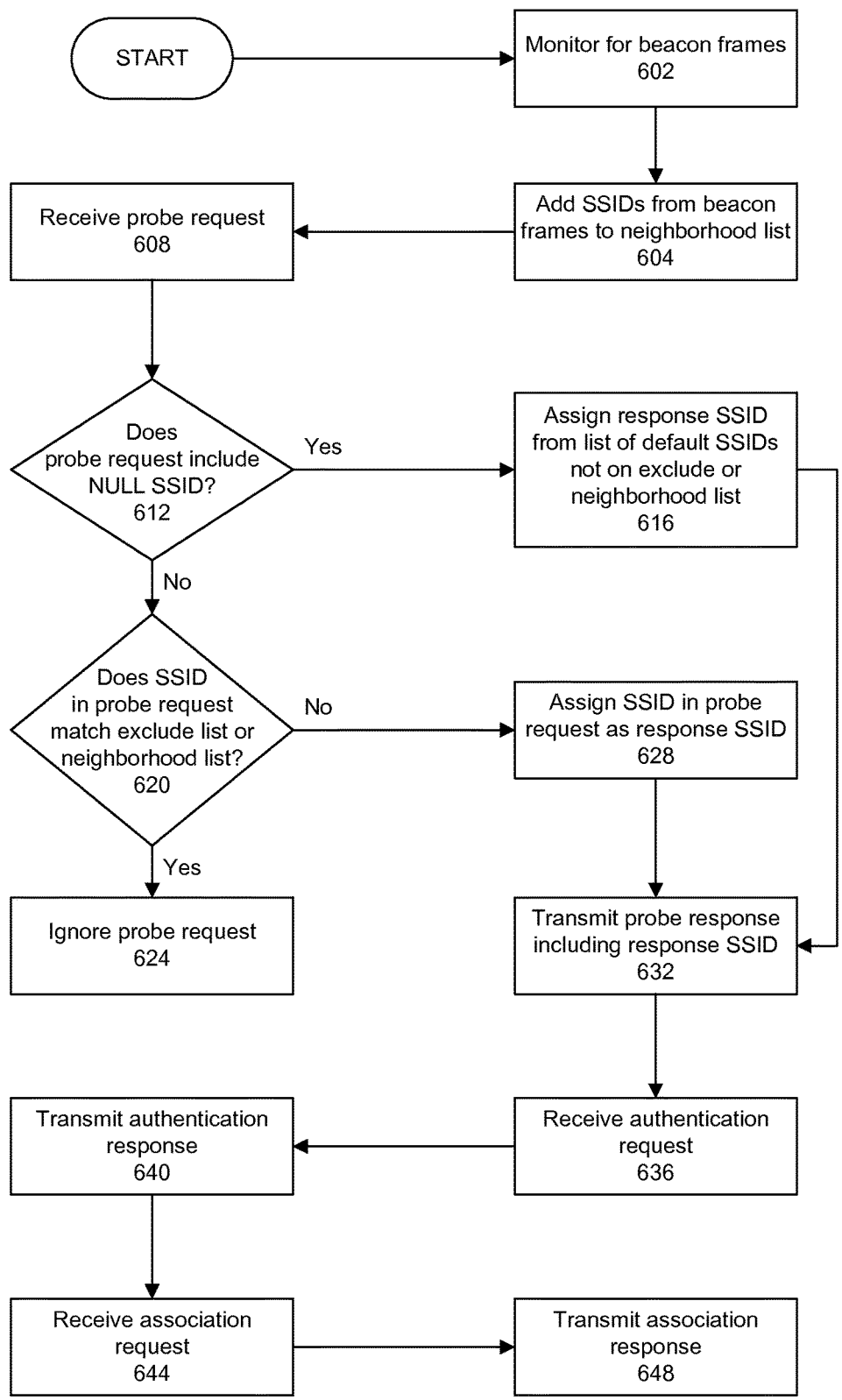
FIG. 6 provides an overview of an exemplary method in accordance with one or more embodiments.

FIG. 6 provides an overview of an exemplary method in accordance with one or more embodiments. At 602, a wireless access point optionally monitors for beacon frames from other wireless networks, such as other wireless infrastructure networks or other wireless mesh networks, and the like. For example, a wireless access point may monitor for beacon frames from other wireless access points, such as neighboring wireless access points. Upon detection of the beacon frames from these other wireless networks, the network identifier associated with the beacon frames are added to a neighborhood list, at 604, such as a list including SSIDs of networks detected in the vicinity of the wireless access point. The process of monitoring for beacon frames and adding SSIDs from the beacon frames to the neighborhood list may be performed continuously and/or periodically, such as to allow the neighborhood list to be updated periodically and/or in real-time. In this way, compiling a neighborhood list is useful to prevent the wireless access point from inadvertently or erroneously associating with client devices attempting to connect to a neighboring wireless network. In some method embodiments, however, monitoring for beacon frames from other wireless networks and compiling a neighborhood list are optional and may not be performed.

At 608, a probe request is received by a wireless access point, such as a probe request from a wireless client device, also referred to herein as a station (STA). In response to the probe request, the wireless access point determines, at 612, whether the probe request includes a null network identifier, such as a probe request that contains no SSID. If the probe request does include a null network identifier, such as an empty or null SSID, the wireless access point assigns, at 616, a response network identifier to be used in a probe response, from a predetermined list of network identifiers. For example, a predetermined (default) list of network identifiers may be obtained from a controller or through user input. Optionally, a predetermined list of network identifiers may be automatically assigned or generated. Further, the list of predetermined or default network identifiers may include SSIDs which are common in a geographic area, such as SSIDs used at a coffeehouse, airport, or by one or more internet service providers, etc. Examples of default network identifiers further include SSIDs that routinely provide unsecured, open and free public wireless network access. Specific default network identifier examples include, but are not limited to, SSIDs including xfinitywifi, attwifi, Google Starbucks WiFi, PEETS, cablewifi, TWCWiFi, tmobile, swisscom, orange, AWG-WiFi, Linksys, dlink, NETGEAR, Boingo Hotspot, gogoinflight, Internet, United_Wi-Fi, DEN Airport Free WiFi, etc. If monitoring for beacon frames for neighboring networks, detected neighboring SSIDs matching SSIDs on the default list are optionally removed from the default list. Similarly, SSIDs matching SSIDs on an exclude list are optionally removed from the default list.

If the probe request does not include a null or empty network identifier, then the probe request should include a specific network identifier identifying a network the client device is looking for. At 620, it is determined whether the network identifier, such as an SSID, included in the probe request matches SSIDs in the neighborhood list or in an exclude list. An exclude list is an optional list that is automatically generated and/or provided by a user, network controller, or administrator. The exclude list includes network identifiers which have been preconfigured for being ignored by a wireless access point. Optionally, an exclude list may include one or more network identifiers or wildcard (i.e., partial) network identifiers. If the SSID in the probe request matches the exclude or neighborhood list, the probe request is ignored, at 624. If the network identifier included in the probe request is not on the exclude or neighborhood list, the network included in the probe request is assigned as the response network identifier to be used in a probe response. At 632, a probe response is transmitted by the wireless access point, such as a probe response that includes the response SSID that was previously assigned at 628 or 616.

At 636, an authentication request is received at the wireless access point, such as an authentication request transmitted by a client device after and/or in response to receiving a probe response. At 640, an authentication response is transmitted by the wireless access point, such as to signify to a client device that the authentication is completed in a successful manner. As necessary, the authentication request and response includes information about the wireless access point, such as a MAC address and/or a BSSID, and information about the client device, such as a MAC address.

At 644, the wireless access point receives an association request, such as an association request transmitted by a client device after and/or in response to receiving an authentication response. At 648, an association resonse is transmitted by the wireless access point, such as to signify to a client device that the association is successful. As necessary, the association request and response includes information about the wireless connection, wireless access point andclient device, such as an SSID, BSSID, MAC addresses, and an association ID (AID). Upon receiving the AID, the client device may be associated with the access point.

Figure 7:
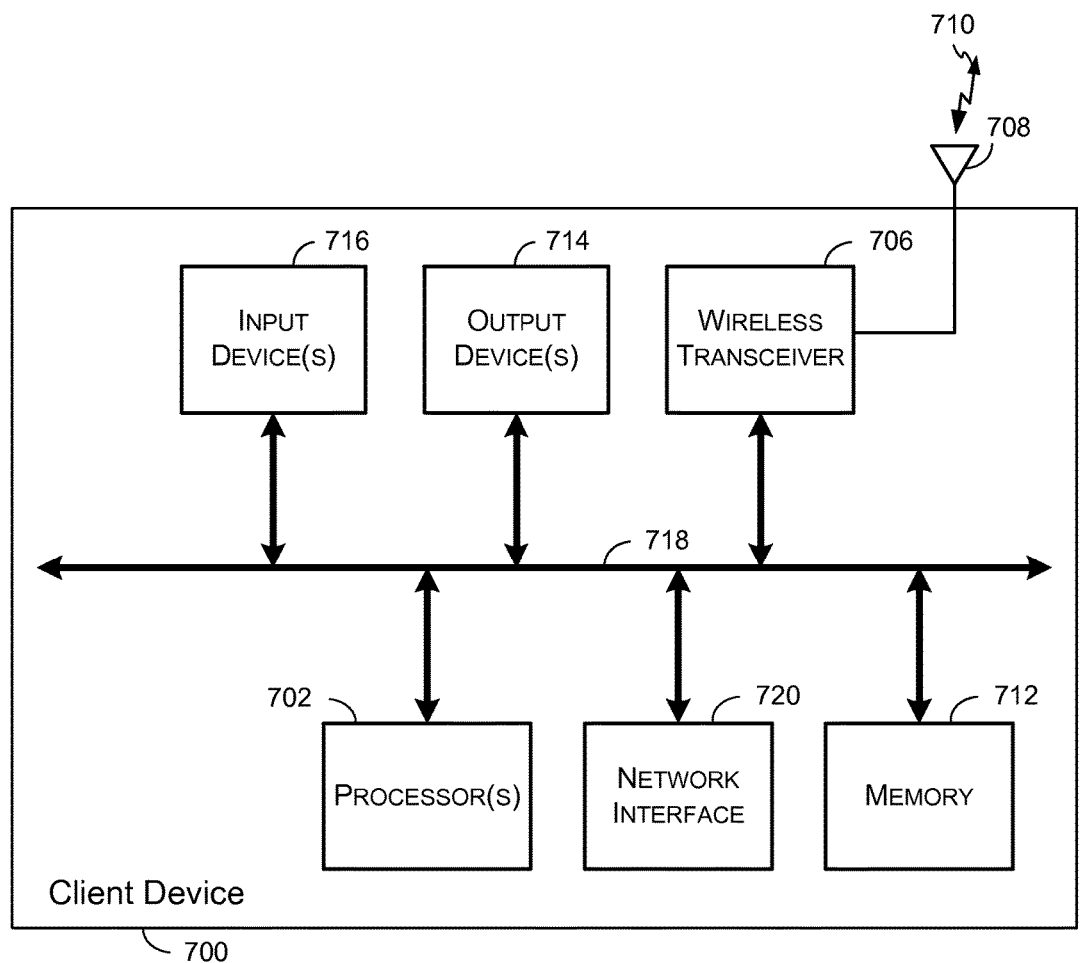
FIG. 7 is a block diagram illustrating an example of a client device, in accordance with some embodiments.

FIG. 7 illustrates an example of a client device 700, such as a device that can connect to a wireless network, for example by association with a wireless access point. Client devices may also referred to herein as wireless devices, stations, network devices and the like. The client device 700 includes hardware elements that can be electrically coupled via a bus 718 (or may otherwise be in communication, as appropriate). In one embodiment, the bus 718 can be used for the processor(s) 702 to communicate between cores and/or with the memory 712. The hardware elements may include one or more processors 702, including without limitation one or more general-purpose processors and/or one or more special-purpose processors (such as digital signal processing chips, graphics acceleration processors, and/or the like); one or more input devices 716; one or more output devices 714; and one or more wireless transceivers 706. Optionally, input device 716 can include numerous devices including, without limitation, a camera, a mouse, a keyboard, a touch sensitive screen, a touch pad, a keypad, and/or the like. Optionally, output device 714 can include numerous devices including, but not limited to, a display, a printer and/or the like. Client devices optionally include one or more network interfaces 720, such as for network communications over a wired medium, such as a twisted pair cable, a coaxial cable, a fiber optic cable or other network communication cable. For example, network interface 720 may provide for a wired network connection to an IEEE 802.3 compliant Ethernet network.

The client device 700 includes one or more wireless transceivers 706 connected to the bus 718. The wireless transceiver 706 may be operable to transmit and/or receive wireless signals (e.g., signal 710) via one or more antennas 708. A wireless signal 710 received by client device 700 may be transmitted via a wireless device compliant with a wireless communications standard that the client device 700 supports. A wireless signal 710 transmitted by client device 700 may be a wireless signal compliant with a wireless communications standard that the client device 700 supports. For example, embodiments are contemplated where the wireless communications standard is one or more of IEEE 802.11, Bluetooth, Zigbee, UWB, wireless USB, Z-Wave and the like. In an exemplary embodiment, the wireless communications standard is an IEEE 802.11 standard, such as 802.11n or 802.11ac. Wireless transceiver 706 may be configured to transmit and/or receive various radio frequency (RF) signals (e.g., signal 710) via antenna 708 from one or gateways, network devices, access points, other client devices, cellular networks, and/or the like. Client device 700 may also be configured to decode and/or decrypt various signals received.

The client device 700 may further include (and/or be in communication with) one or more non-transitory machine-readable storage mediums or storage devices (e.g., memory 712), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 712, such as RAM, ROM, FLASH, or disc drive, and executed by processor(s) 702. The client device 700 can also comprise software elements or functions (e.g., located within the memory 712), including, for example, an operating system, device drivers, executable libraries, and/or other code, such as one or more application programs, which may comprise computer programs implementing various functions. Memory 712 may be a non-transitory machine-readable storage medium, processor-readable memory, and/or a computer-readable memory that stores the one or more computer-program products configured to cause the processor(s) 702 to perform various functions. In other embodiments, various functions described may be performed in hardware.

Figure 8:
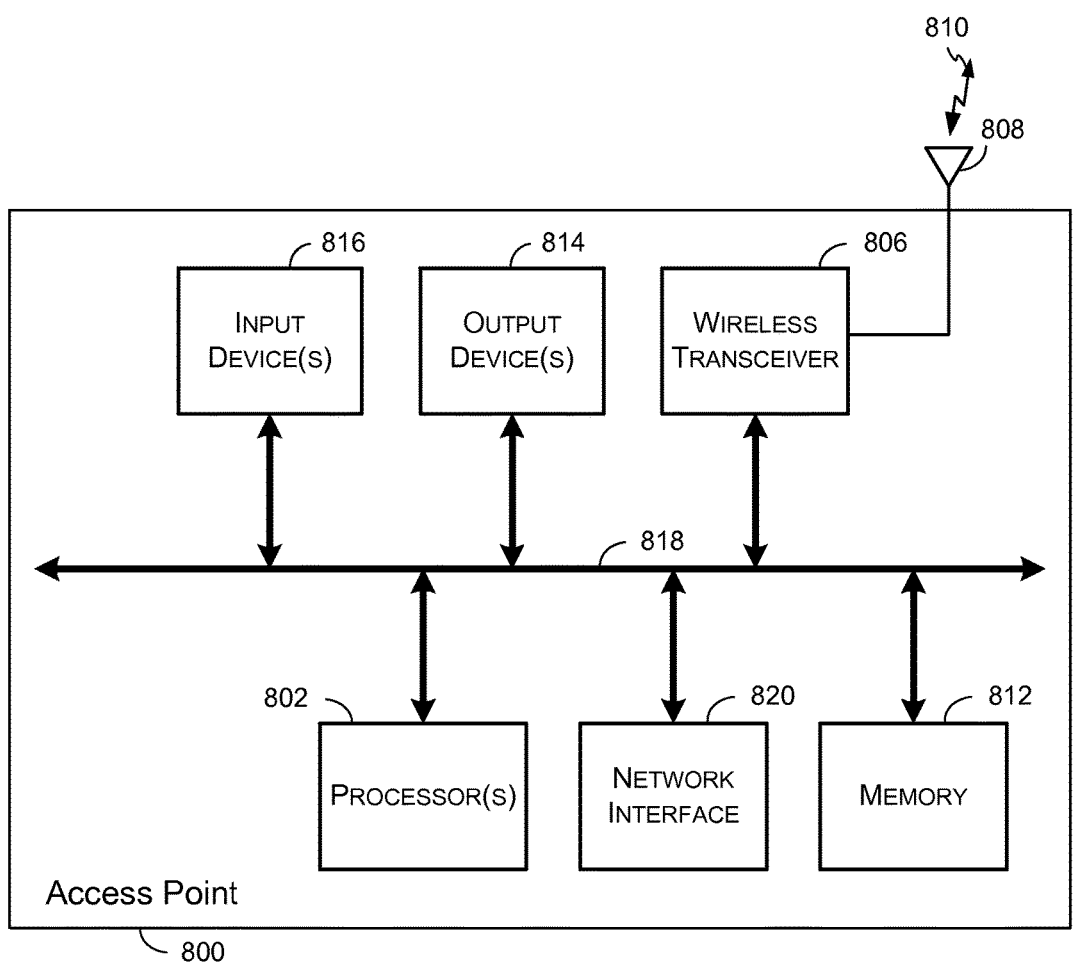
FIG. 8 is a block diagram illustrating an example of an access point, in accordance with some embodiments.

FIG. 8 illustrates an example of an access point 800. The access point 800 may optionally include or otherwise function as a range extending device, a router, a gateway, a modem, and/or any other device that provides network access among one or more computing devices and/or networks. For example, access point 800 may include a router gateway with access point and router functionality, and may further include an Ethernet switch and/or a modem. As another example, the access point 800 may include a range extender that may be used to improve signal range and strength within a wireless network by taking an existing signal from another access point and rebroadcasting the signal to create an expanded logical network.

The access point 800 includes hardware elements that can be electrically coupled via a bus 818 (or may otherwise be in communication, as appropriate). In one embodiment, the bus 818 can be used for the processor(s) 802 to communicate between cores and/or with the memory 812. The hardware elements may include one or more processors 802, including without limitation one or more general-purpose processors and/or one or more special-purpose processors (such as digital signal processing chips, graphics acceleration processors, and/or the like); one or more input devices 816, which can include without limitation one or more buttons, a keyboard, a keypad, a touch sensitive screen, a touch pad, and/or the like; and one or more output devices 814, which can include, without limitation, a display, light or sound indicators, and/or the like.

The access point 800 may include one or more wireless transceivers 806 connected to the bus 818. The wireless transceiver 806 may be operable to receive and transmit wireless signals (e.g., a wireless signal 810) via an antenna 808. The wireless transceiver 806 may include a transceiver radio designed to transmit and receive signals in compliance with a wireless communications standard. Exemplary wireless communications standards include, but are not limited to, IEEE 802.11 (also referred to herein as WiFi or Wi-Fi), Bluetooth, Zigbee, UWB, wireless USB and Z-Wave. In various embodiments, a wireless communications standard specifies frequency bands, channels, data packet characteristics and other transmission characteristics necessary for inter device-communication. For example, wireless transceiver 806 may include a 2.4 GHz WiFi circuit or a 5 GHz WiFi circuit. Accordingly, the access point 800 may include a single WiFi circuit for a WiFi communications, and a single Bluetooth circuit for Bluetooth communications. In some embodiments, the access point 800 may include multiple wireless transceivers (not shown) for each available communications standard. The antenna 808 may include multiple band antennas that can transmit and/or receive signals over different frequency bands.

The access point 800 may further include a radio frequency (RF) circuit. In some embodiments, the wireless transceiver 806 may be integrated with or coupled to the RF circuit so that the RF circuit includes the wireless transceiver 806. In some embodiments, the wireless transceiver 806 and the RF circuit are separate components. The RF circuit may include a RF amplifier that may amplify signals received over antenna 808. The RF circuit may also include a power controller that may be used to adjust signal amplification by the RF amplifier. The power controller may be implemented using hardware, firmware, software, or any combination thereof.

The wireless signal 810 may be transmitted via a wireless communication channel. In some embodiments, the wireless communication channel may be any wireless communication channel established between two or more devices, such as a wireless local area network (e.g., a WiFi network), a Personal Access Network (e.g., between Bluetooth, Zigbee, UWB or wireless USB compatible devices), or a cellular network (e.g., a GSM, WCDMA, LTE, CDMA2000 network). The wireless transceiver 806 may be configured to receive various radio frequency (RF) signals (e.g., signal 810) via antenna 808, respectively, from one or more other access points, network devices, beacons and/or the like. Access point 800 may also be configured to decode and/or decrypt various signals received from one or more access points, network devices, wireless devices, and/or the like.

The access point 800 may include a power supply (not shown) that can power the various components. The power supply may include a switched-mode power supply, a linear power supply, a push-pull power supply, or any other suitable type of power supply. In some embodiments, the access point 800 may include multiple power supplies. For example, a switched-mode power supply may be used to condition input power, and a linear power supply may be used to power the RF circuit. The power supply may be configured to operate over various ranges of appropriate input voltages.

Alternatively, the access point 800 may include circuitry for receiving voltage, current or power via an external power supply or a Power over Ethernet connection. Power over Ethernet support is optionally provided by network interface 820. Network interface 820 can provide for network connections to external devices via any standardized or specialized network connection, such as IEEE 802.3. In an exemplary embodiment, network interface 820 provides support for a wired Ethernet connection to a network. Other wired network technologies are contemplated for connection to networks, as will be understood by the skilled artisan; however, due to its ubiquitous nature and support for Power over Ethernet, wired Ethernet over twisted pairs may be preferentially employed.

The access point 800 may further include (and/or be in communication with) one or more non-transitory machine-readable storage mediums or storage devices (e.g., memory 812), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 812, such as RAM, ROM, FLASH, or disc drive, and executed by processor(s) 802. The access point 800 can also comprise software elements (e.g., located within the memory 812), including, for example, an operating system, device drivers, executable libraries, and/or other code, such as one or more application programs, which may comprise computer programs implementing the functions provided by various embodiments, and/or may be designed to implement methods and/or configure systems, as described herein.

Figure 9:
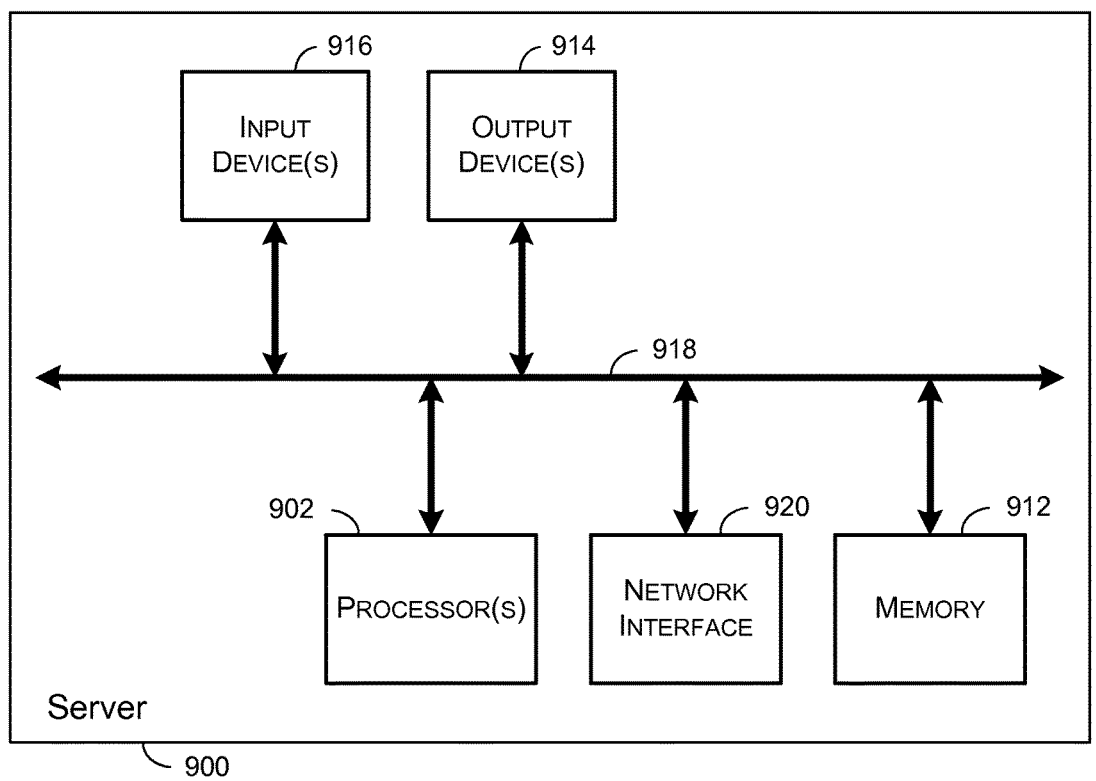
FIG. 9 is a block diagram illustrating an example of a server, in accordance with some embodiments.

FIG. 9 illustrates an example of a server 900. In various embodiments, server 900 may communicate with other devices such as using one or more wireless or wired data networks. Server 900 may provide network services and/or may be used to control and/or manage one or more wireless devices, such as one or more wireless access points. The server 900 includes hardware elements that can be electrically coupled via a bus 918 (or may otherwise be in communication, as appropriate). In one embodiment, the bus 918 can be used for the processor(s) 902 to communicate between cores and/or with the memory 912. The hardware elements may include one or more processors 902, including without limitation one or more general-purpose processors and/or one or more special-purpose processors (such as digital signal processing chips, graphics acceleration processors, and/or the like), memory 912, output devices 914, input devices 916, a bus 918 and a network interface 920. Furthermore, in addition to the network interface 920, server 900 can optionally further include a wireless transceiver to communicate with a network (e.g., a wireless local area network, a wireless network of a preferred carrier, Internet, etc.).

The server 900 may further include (and/or be in communication with) one or more non-transitory machine-readable storage mediums or storage devices (e.g., memory 912), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more one or more computer-program products, such as instructions or code, in memory 912. The server 900 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the aspects of methods described herein, such as centralized management and control over wireless access points, beacons, etc. The memory 912 may be a non-transitory machine-readable storage medium, processor-readable memory, and/or a computer-readable memory that stores the one or more computer-program products configured to cause the processor(s) 902 to perform the functions described. In other embodiments, one or more of the functions described may be performed in hardware.

A set of these instructions and/or code is optionally stored on a non-transitory machine-readable storage medium, such as the memory 912. In some cases, the storage medium is optionally incorporated within a computer system. In other embodiments, the storage medium is optionally separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the server 900 and/or may take the form of source and/or installable code, which, upon compilation and/or installation on the server 900 (e.g., using any of a variety of generally available compilers, installation programs, compression/decompression utilities, etc.) then takes the form of executable code.

Merely by way of example, one or more procedures described with respect to the processes or methods discussed above, for example as described with respect to FIG. 6 or any portion thereof, may be implemented as code and/or instructions executable by a computer or device (and/or a processor within a computer or device); in an aspect, then, such code and/or instructions can be used to configure and/or adapt a general purpose computer (or other device) to perform one or more operations in accordance with the described methods. Such functions or code may include code to perform the steps described above with respect to FIG. 6 and portions thereof. The memory may be a non-transitory machine-readable storage medium, processor-readable memory, and/or a computer-readable memory that stores the one or more computer-program products configured to cause the processor(s) to perform the functions described. In other embodiments, one or more of the functions described may be performed in hardware. Aspects of the disclosed methods, when performed by a general purpose computer, allow the general purpose computer to perform more efficiently, such as by performing an operation in fewer steps or using less memory or processing time, than prior methods. Further, performance of aspects of the disclosed methods by a general purpose computer may transform the general purpose computer into a special purpose computer, such as a network device, a wireless access point, a wireless client, etc. Aspects of the disclosed methods, when performed by a general purpose computer, further allow the general purpose computer to perform new functions and/or to perform functions in new ways, such as in more useful orders. For example, aspects of the disclosed methods achieve simplified and/or more efficient operation of network devices, such as client devices and wireless access point, as well as efficiency gains in operation of wireless networking and use of the radio frequency medium.

A set of these instructions and/or code might be stored on a non-transitory machine-readable storage medium, such as the memory. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by a computer or device and/or might take the form of source and/or installable code, which, upon compilation and/or installation on the computer or device (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A computer implemented method, comprising:
receiving a probe request at a wireless access point, wherein the wireless access point includes an access point network identifier, wherein probe requests include directed probe requests and null probe requests, wherein a directed probe request includes a probe network identifier, wherein the probe network identifier is different from the access point network identifier, and wherein a null probe request does not include a network identifier;
determining whether the probe request is a directed probe request or a null probe request;
determining a probe response, wherein the probe response includes a response network identifier, wherein the response network identifier is different from the access point network identifier, wherein the response network identifier is the probe network identifier when the probe request is a directed probe request, wherein the response network identifier is a default network identifier when the probe request is a null probe request, and wherein the default network identifier is different from the access point network identifier;
transmitting the probe response;
receiving an association request, wherein the association request includes the response network identifier and a station identifier for a client device; and
transmitting an association response, wherein the association response includes an association identifier for a client device having the station identifier and wherein receiving the association identifier at a client device having the station identifier causes the client device to become associated with the wireless access point using the response network identifier.

2. The method of claim 1, further comprising:
receiving a beacon frame, wherein the beacon frame includes a neighboring network identifier;
storing the neighboring network identifier in a list of neighboring networks, wherein probe requests including neighboring network identifiers on the list are ignored.

3. The method of claim 1, wherein receiving the association identifier at a client device having the station identifier causes the client device to reduce a transmission rate of or cease transmissions of probe requests.

4. The method of claim 1, further comprising:
comparing the probe network identifier with a list of excluded network identifiers, wherein probe requests including probe network identifiers on the list are ignored.

5. The method of claim 1, further comprising:
receiving a wireless authentication request, wherein the wireless authentication request includes the station identifier; and
transmitting a wireless authentication response including the station identifier, wherein the wireless authentication response indicates whether authentication was successful.

6. The method of claim 5, wherein receiving the wireless authentication response at a client device having the station identifier causes the client device to transmit an association request.

7. The method of claim 1, wherein a network identifier includes a service set identifier (SSID).

8. The method of claim 1, wherein a station identifier includes a media access control (MAC) address.

9. The method of claim 1, wherein the default network identifier is selected from a list of predetermined network identifiers, wherein the predetermined network identifiers are different from the access point network identifier.

10. The method of claim 1, wherein the probe request is a null probe request, and wherein the method further comprises:
transmitting an additional probe request, wherein the additional probe includes an additional network identifier different from the access point network identifier and different from the default network identifier.

11. The method of claim 1, further comprising:
receiving a second probe request including a second probe network identifier, wherein the second probe network identifier is different from the access point network identifier,
determining a second probe response, wherein the second probe response includes the second probe network identifier, and wherein the second probe network identifier is different from the response network identifier;
transmitting the second probe response;
receiving a second association request, wherein the second association request includes the second probe network identifier and a second station identifier for a second client device; and
transmitting a second association response, wherein the second association response includes the second association identifier for the second client device having the second station identifier and wherein receiving the second association identifier at the second client device having the second station identifier causes the second client device to become associated with the wireless access point using the second probe network identifier.

12. A system comprising:
one or more processors; and
a non-transitory computer readable storage medium communicatively coupled to the one or more processors, wherein the non-transitory computer readable storage medium includes instructions that, when executed by the one or more processors, cause the one or more processors to perform operations including:
receiving a probe request at a wireless access point, wherein the wireless access point includes an access point network identifier, wherein probe requests include directed probe requests and null probe requests, wherein a directed probe request includes a probe network identifier, wherein the probe network identifier is different from the access point network identifier, and wherein a null probe request does not include a network identifier;
determining whether the probe request is a directed probe request or a null probe request;
determining a probe response, wherein the probe response includes a response network identifier, wherein the response network identifier is different from the access point network identifier, wherein the response network identifier is the probe network identifier when the probe request is a directed probe request, wherein the response network identifier is a default network identifier when the probe request is a null probe request, and wherein the default network identifier is different from the access point network identifier;

transmitting the probe response;

receiving an association request, wherein the association request includes the response network identifier and a station identifier for a client device; and transmitting an association response, wherein the association response includes an association identifier for a client device having the station identifier and wherein receiving the association identifier at a client device having the station identifier causes the client device to become associated with the wireless access point using the response network identifier.

13. The system of claim 12, wherein the operations further include:

receiving a beacon frame, wherein the beacon frame includes a neighboring network identifier;

storing the neighboring network identifier in a list of neighboring networks, wherein probe requests including neighboring network identifiers on the list are ignored.

14. The system of claim 12, wherein receiving the association identifier at a client device having the station identifier causes the client device to reduce a transmission rate of or cease transmissions of probe requests.

15. The system of claim 12, wherein the operations further include:

comparing the probe network identifier with a list of excluded network identifiers, wherein probe requests including probe network identifiers on the list are ignored.

16. The system of claim 12, wherein the operations further include:

receiving a wireless authentication request, wherein the wireless authentication request includes the station identifier; and transmitting a wireless authentication response including the station identifier, wherein the wireless authentication response indicates whether authentication was successful.

17. The system of claim 16, wherein receiving the wireless authentication response at a client device having the station identifier causes the client device to transmit an association request.

18. The system of claim 12, wherein a network identifier includes a service set identifier (SSID).

19. The system of claim 12, wherein a station identifier includes a media access control (MAC) address.

20. A non-transitory computer readable medium comprising instructions that, when executed by one or more processors, cause the one or more processors to perform operations including:

receiving a probe request at a wireless access point, wherein the wireless access point includes an access point network identifier, wherein probe requests include directed probe requests and null probe requests, wherein a directed probe request includes a probe network identifier, wherein the probe network identifier is different from the access point network identifier, and wherein a null probe request does not include a network identifier;

determining whether the probe request is a directed probe request or a null probe request;

determining a probe response, wherein the probe response includes a response network identifier, wherein the response network identifier is different from the access point network identifier, wherein the response network identifier is the probe network identifier when the probe request is a directed probe request, wherein the response network identifier is a default network identifier when the probe request is a null probe request, and wherein the default network identifier is different from the access point network identifier;

transmitting the probe response;

receiving an association request, wherein the association request includes the response network identifier and a station identifier for a client device; and transmitting an association response, wherein the association response includes an association identifier for a client device having the station identifier and wherein receiving the association identifier at a client device having the station identifier causes the client device to become associated with the wireless access point using the response network identifier.

* * * * *